(12) United States Patent
Krishnamurthy (10) Patent No.: US 10,574,711 B2
(45) Date of Patent: Feb. 25, 2020

(54) EFFICIENT MULTIMEDIA CONTENT DISCOVERY AND NAVIGATION BASED ON REASON FOR RECOMMENDATION

(71) Applicant: Kishore Adekhandi Krishnamurthy, Bangalore (IN)

(72) Inventor: Kishore Adekhandi Krishnamurthy, Bangalore (IN)

(73) Assignee: SUREWAVES MEDIATECH PRIVATE LIMITED, Karnataka (IN)

( * ) Notice: Subject to any disclaimer, the term of this patent is extended or adjusted under 35 U.S.C. 154(b) by 102 days.

(21) Appl. No.: 13/763,634

(22) Filed: Feb. 9, 2013

(65) Prior Publication Data

US 2013/0212493 A1    Aug. 15, 2013

(51) Int. Cl.

| H04L 29/06 | (2006.01) |
| H04L 29/08 | (2006.01) |
| H04N 21/25 | (2011.01) |
| H04N 21/466 | (2011.01) |
| H04N 21/4788 | (2011.01) |

(52) U.S. Cl.
CPC ........ H04L 65/403 (2013.01); H04L 65/4084 (2013.01); H04L 67/306 (2013.01); H04N 21/252 (2013.01); H04N 21/4668 (2013.01); H04N 21/4788 (2013.01)

(58) Field of Classification Search
CPC ....... H04N 2005/44569; H04N 21/466; H04N 21/4668; H04N 21/4826; G06F 17/30837; G06F 17/30843
USPC ......... 715/716, 719, 721; 725/37, 44–47, 61
See application file for complete search history.

(56) References Cited

U.S. PATENT DOCUMENTS

| 2005/0102696 A1* | 5/2005 | Westberg | H04N 5/44543 725/46 |
| 2008/0141133 A1* | 6/2008 | Yamamoto | G06F 17/30743 715/716 |
| 2009/0307726 A1* | 12/2009 | Levin | H04N 5/44543 725/46 |
| 2010/0031162 A1* | 2/2010 | Wiser | G06Q 30/0255 715/747 |
| 2010/0186038 A1* | 7/2010 | Thomas | G06F 17/3082 725/42 |
| 2011/0289075 A1* | 11/2011 | Nelson | G06F 17/30772 707/723 |
| 2012/0047533 A1* | 2/2012 | Westberg | H04N 5/44543 725/46 |

(Continued)

*Primary Examiner* — Seth A Silverman
(74) *Attorney, Agent, or Firm* — Barry Choobin; Patent 360 LLC (57) ABSTRACT

A method of multimedia content discovery and navigation based on criteria for recommendation includes displaying a multimedia content based on a criteria for recommending the multimedia content, displaying the criteria for recommending the multimedia content along with the multimedia content, processing a first input that includes a selection of the multimedia content, and playing the multimedia content on the selection of the multimedia content. The multimedia content display module may display a second set of multimedia content associated with the second criteria on the selection of the second criteria. The first criteria may include at least one of (i) reasons based on popularity, (ii) reasons based on user favorites, and (iii) reasons based on friends' activities.

4 Claims, 8 Drawing Sheets

(56) References Cited

U.S. PATENT DOCUMENTS

2013/0097623 A1\* 4/2013 Lai .................... H04N 21/4223
  725/9
2014/0088952 A1\* 3/2014 Fife ........................ G06F 17/27
  704/9

\* cited by examiner

EFFICIENT MULTIMEDIA CONTENT DISCOVERY AND NAVIGATION BASED ON REASON FOR RECOMMENDATION

CROSS-REFERENCE TO RELATED APPLICATIONS

This application claims priority to Indian patent application no. 496/CHE/2012 filed on Feb. 9, 2012, and 337/CHE/2013 filed on Jan. 24, 2013 the complete disclosure of which, in its entirety, is herein incorporated by reference.

BACKGROUND

Technical Field

The embodiments herein generally relate to multimedia content, and more particularly, to displaying a particular video along with at least one criteria to select that particular video, navigating one or more videos via that the particular video.

Description of the Related Art

The World Wide Web (WWW) includes large volumes of multimedia content (e.g., millions of videos, text, pictures etc.) and these volumes are constantly growing. According to a finding, about sixty percent of the data consumed on the internet is online multimedia content. However, in this age of information overload, it may be difficult for a user to locate the multimedia content. Users may find the multimedia content that they are interested in, in a chance encounter or upon rigorously searching the web for the intended multimedia content.

Further, directory services, videos shared over social networking sites and the multimedia content that is forwarded by e-mail or embedded in a blog may help the user to find a multimedia content of interest. In most cases however, a user who is looking for entertainment may not have specific content, or keywords corresponding to specific content in mind. When the user is not clear about the specific content that he/she wants to consume, he is likely to not be able to find content of interest of relevance, and thus leave the content provider website. Thus, there is a loss of revenue to the website that hosts the multimedia content.

Existing methodologies for locating content are based on the user providing specific keywords, and matching them with metadata of the stored multimedia content. Since a user may not have specific content in mind in the first place, he/she is unlikely to locate content that is of interest or relevance. Also, the user would typically only find content that he/she is already aware of, and would thus be unlikely to discover any new content that would be potentially of interest. Accordingly, there remains a need for a method to discover and to easily navigate through multimedia content which helps the user in taking the decision to view the displayed content or not.

SUMMARY

In view of the foregoing, an embodiment herein provides a method of multimedia content discovery and navigation based on criteria for recommendation. The method includes displaying a multimedia content based on a criteria for recommending the multimedia content, displaying the criteria for recommending the multimedia content along with the multimedia content, processing a first input that includes a selection of the multimedia content, and playing the multimedia content on the selection of the multimedia content. The criteria may include one or more (i) reasons based on popularity, (ii) reasons based on user favorites, and (iii) reasons based on friends' activities. The method may further include processing a second input that includes a selection of the criteria, and displaying a first set of multimedia content associated with the criteria on the selection of the criteria.

In another aspect, a multimedia content recommendation server is provided. The multimedia content recommendation server includes (i) a memory unit having a database that stores at least one criteria for recommending multimedia content and at least one list of content associated with the at least one criteria, (ii) a processor that executes a set of modules that includes (a) a criteria display module executed by the processor that is configured to display a first criteria for recommending at least one multimedia content, (b) a criteria selection module executed by the processor that is configured to process a first input that includes a selection of the first criteria for recommending the at least one multimedia content, and (c) a multimedia content display module executed by the processor that is configured to (i) display the at least one multimedia content associated with the first criteria for recommending the at least one multimedia content, and (ii) display a first set of multimedia content associated with the first criteria for recommending the at least one multimedia content on the selection of the first criteria. The at least one criteria may include one or more (i) reasons based on popularity, (ii) reasons based on user favorites, and (iii) reasons based on friends' activities.

In yet another aspect, a non-transitory program storage device readable by a computer, and including a program of instructions executable by the computer to perform a method of multimedia content discovery and navigation based on criteria for recommendation is provided. The method includes displaying a multimedia content based on first criteria for recommending the multimedia content, displaying the first criteria corresponding to the multimedia content, processing a first input that includes a selection of the multimedia content, displaying a first set of multimedia content associated with the first criteria on the selection of the first criteria. The criteria may include one or more (i) reasons based on popularity, (ii) reasons based on user favorites, and (iii) reasons based on friends' activities.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need to give an option for the user to easily navigate other similar videos which helps the user in discovering interesting multimedia content, in turn resulting in better user engagement. The embodiments herein achieve this by providing a multimedia content recommendation server that (i) displays one or more multimedia content (e.g., one or more videos) along with one or more reasons/at least one criteria to the user, (ii) allows the user 102 to a) view/watch a particular video from the one or more videos, b) easily navigate other similar videos along with the one or more reasons/at least one criteria of a particular video being watched. Referring now to the drawings, and more particularly to FIGS. 1 through 6, where similar reference characters denote corresponding features consistently throughout the figures, there are shown preferred embodiments.

Figure 1:
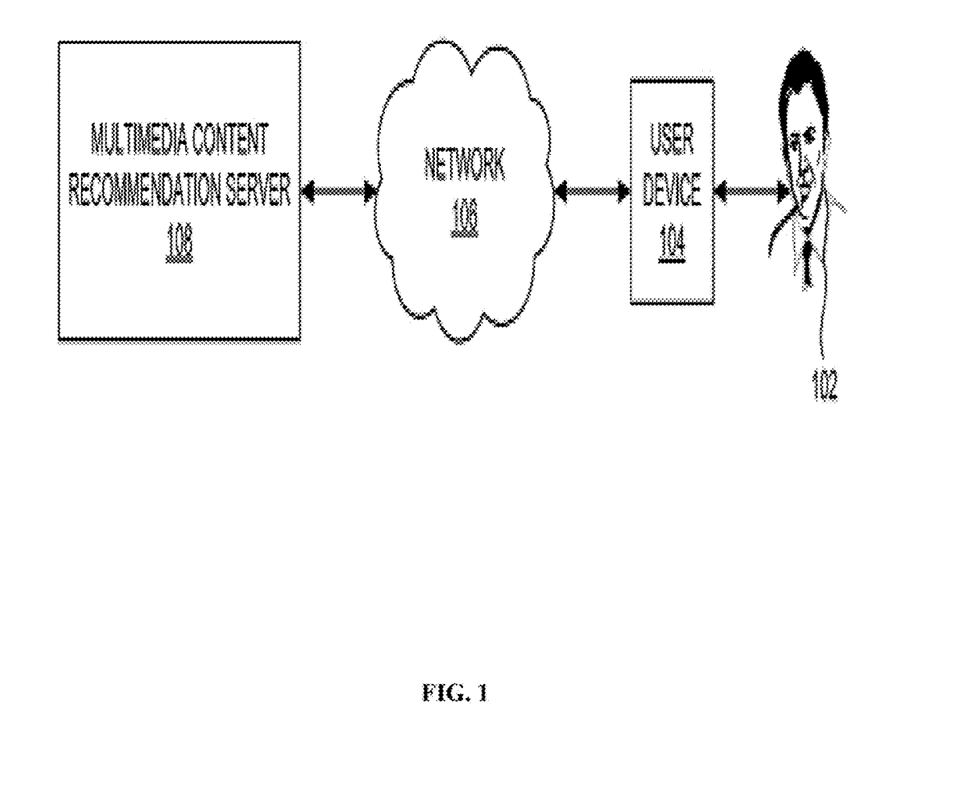
FIG. 1 illustrates a system view of a user communicating with a multimedia content recommendation server through a network according to an embodiment herein.

FIG. 1 illustrates a system view of a user 102 communicating with a multimedia content recommendation server 108 through a user device 104 via a network 106 according to an embodiment herein. The multimedia content recommendation server 108 displays one or more multimedia content (e.g., one or more videos) along with one or more reasons/at least one criteria to the user 102. In one embodiment, the multimedia content may be videos, TV shows, movies or event broadcasts etc. In one embodiment, one or more reasons/at least one criteria may include one or more (i) popularity of one or more (a) multimedia content, (b) entity related to the multimedia content (e.g., topic, persons involved with the multimedia content), (c) all time popular or trending/popular-right-now, (d) popular with in user geography (e.g., a location), and (e) activities on multimedia content by popular celebrities, (ii) user favorites of one or more (a) multimedia content, (b) genre/category, (c) source such as channels, (d) similar to user past activities, and (e) people related to multimedia content/celebrities, (f) activities on multimedia content by favorite celebrities, and (iii) activities on multimedia content from user network of one or more (a) shared by the friend, (b) liked by the friend, (c) friend watched/watching multimedia content, (d) rated by a friend, (e) queue by the friend, and (e) commented by the friend.

The multimedia content recommendation server 108 allows the user 102 to view/watch a particular multimedia content from the one or more multimedia content. The multimedia content recommendation server 108 allows the user 102 to easily navigate other similar multimedia content (e.g., by using the user device 104) along with the one or more reasons/ at least one criteria of a particular video being watched. In other words, the multimedia content recommendation server 108 allows the user 102 to navigate the similar videos via the particular video. The other similar videos are associated with the particular video, in one example embodiment. The user device 104 may be a mobile communication device, a laptop, a personal computer, a television, a personal digital assistant (PDA), and/or any other computing device, etc.

Figure 2:
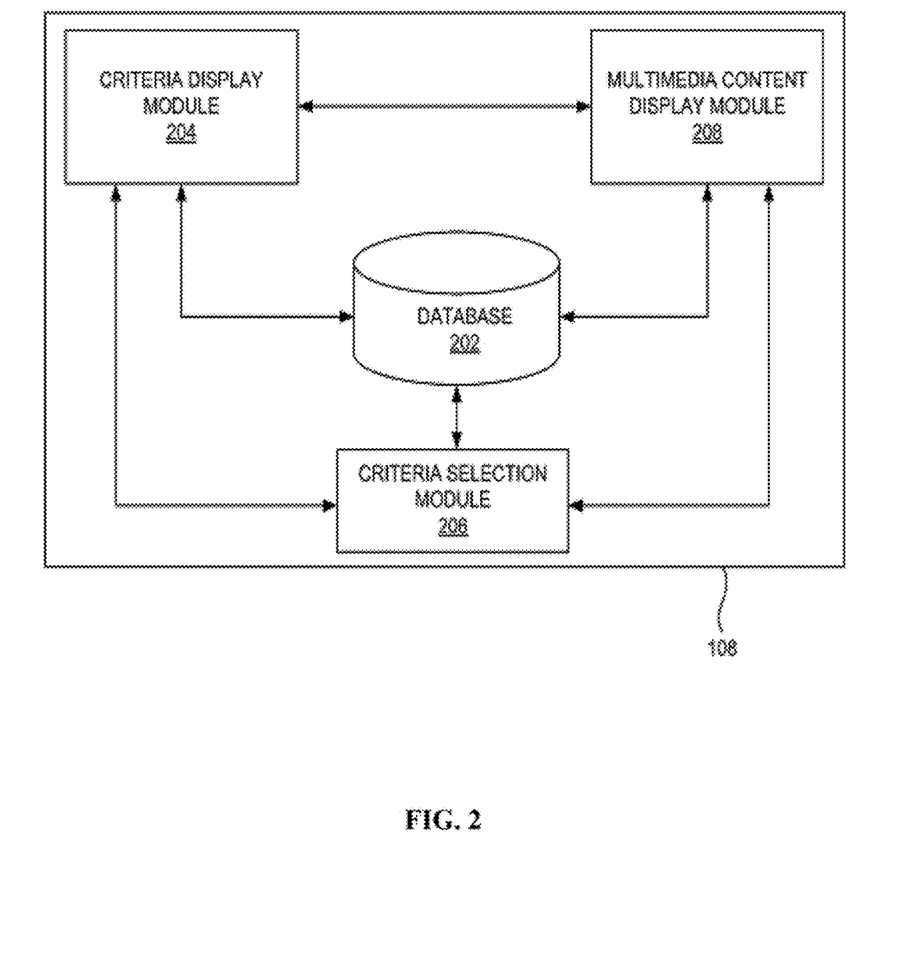
FIG. 2 illustrates an exploded view of the multimedia content recommendation server of FIG. 1 according to an embodiment herein.

FIG. 2 illustrates an exploded view of the multimedia content recommendation server 108 of FIG. 1 according to an embodiment herein. The multimedia content recommendation server 108 includes a database 202, a criteria display module 204, a criteria selection module 206, and a multimedia content display module 208. The database 202 stores one or more criteria for recommending multimedia content and one or more list of content associated with the one or more criteria. The database 202 further stores one or more criteria associated with a profile of the user 102. The one or more criteria are a user preference, in one example embodiment. The one or more criteria are one or more reasons, in another example embodiment.

The criteria display module 204 that is configured to display a first criteria for recommending one or more multimedia content. The criteria selection module 206 that is configured to process a first input which includes a selection of the first criteria for recommending the one or more one multimedia content. The multimedia content display module 208 (i) displays the one or more multimedia content associated with the one or more first criteria for recommending the one or more multimedia content, (ii) displays a first set of multimedia content associated with the one or more first criteria for recommending the one or more multimedia content on the selection of the first criteria. In one embodiment, the first criteria may include one or more (i) reasons based on popularity, (ii) reasons based on user favorites, and (iii) reasons based on friends' activities.

The multimedia content display module 208 displays the one or more videos (or any other multimedia content) along with the one or more reasons (e.g., popularity, one or more celebrities have viewed or shared the one or more videos, high rating, viewed or shared by one or more friends/family, the one or more videos are currently trending, buzzing videos, the one or more videos are broadcasted in one or more popular TV channels, an affinity indicated by the user 102, etc.). The one or more videos are tagged with one or more reasons in one example embodiment. The one or more videos are a set of recommended videos, in another example embodiment. In one embodiment, the navigation module allows the user 102 to navigate to a particular video for watching. Upon receiving an input (e.g., a click) on the particular video, the user 102 may watch the particular video. In one embodiment, the input may include the first input and the second input. The other similar videos (e.g., one or more related videos) may be displayed with one or more reasons via the particular video based on the input, in one example embodiment. The multimedia content recommendation server 108 delivers and/or presents the particular video and other similar videos in a user interface format, in another example embodiment.

Figure 3A:
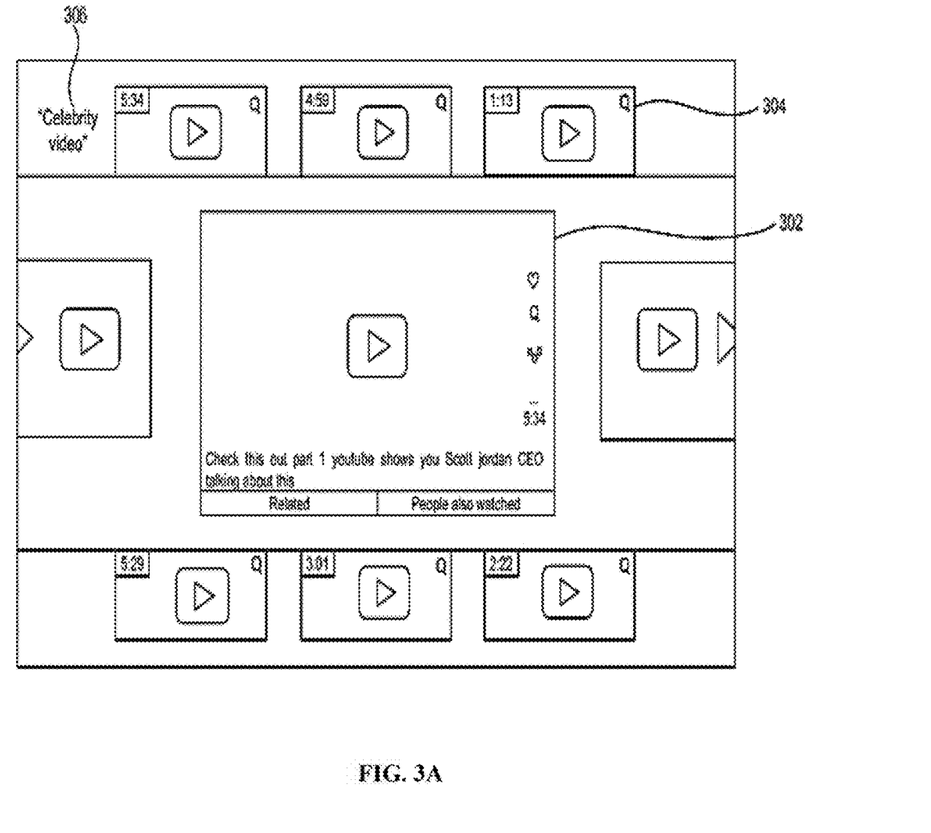
FIG. 3A through FIG. 3C illustrates a user interface view of the multimedia content recommendation server of FIG. 1 according to an embodiment herein.
Figure 3B:
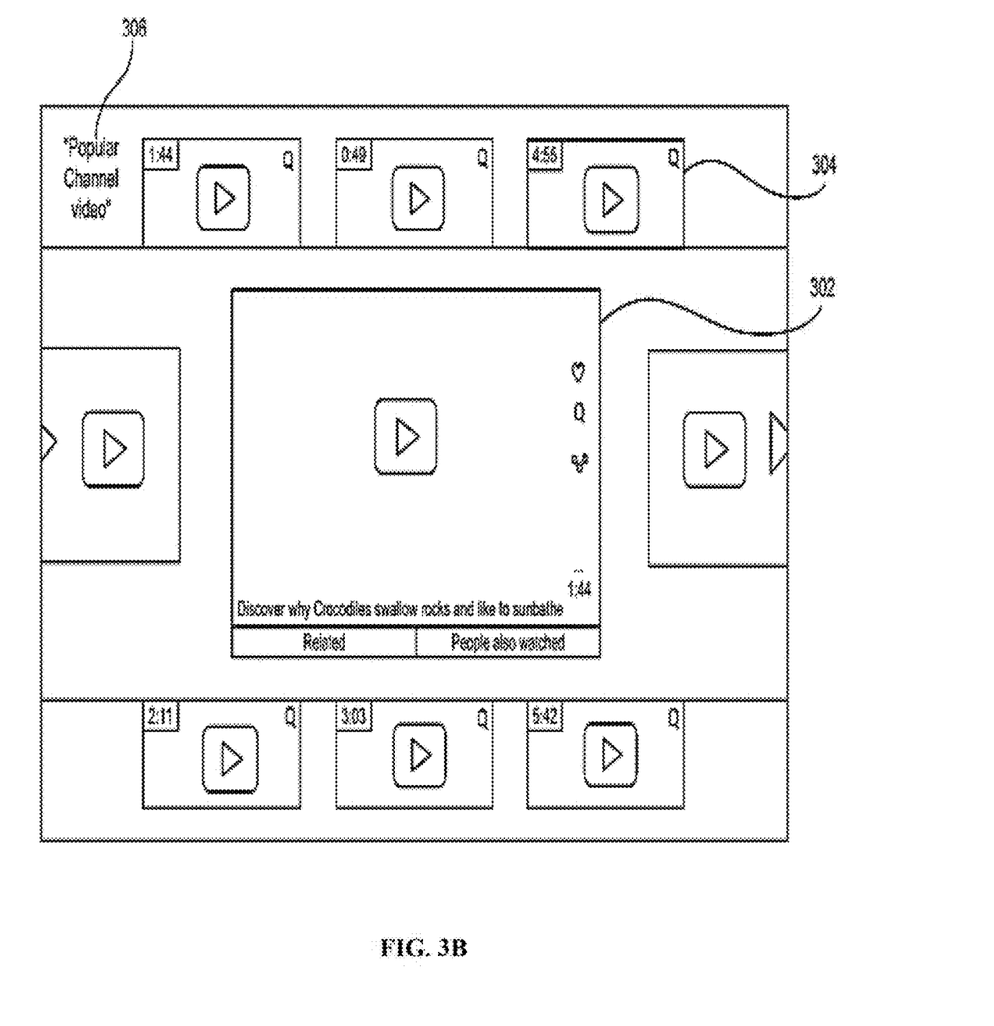
Figure 3C:
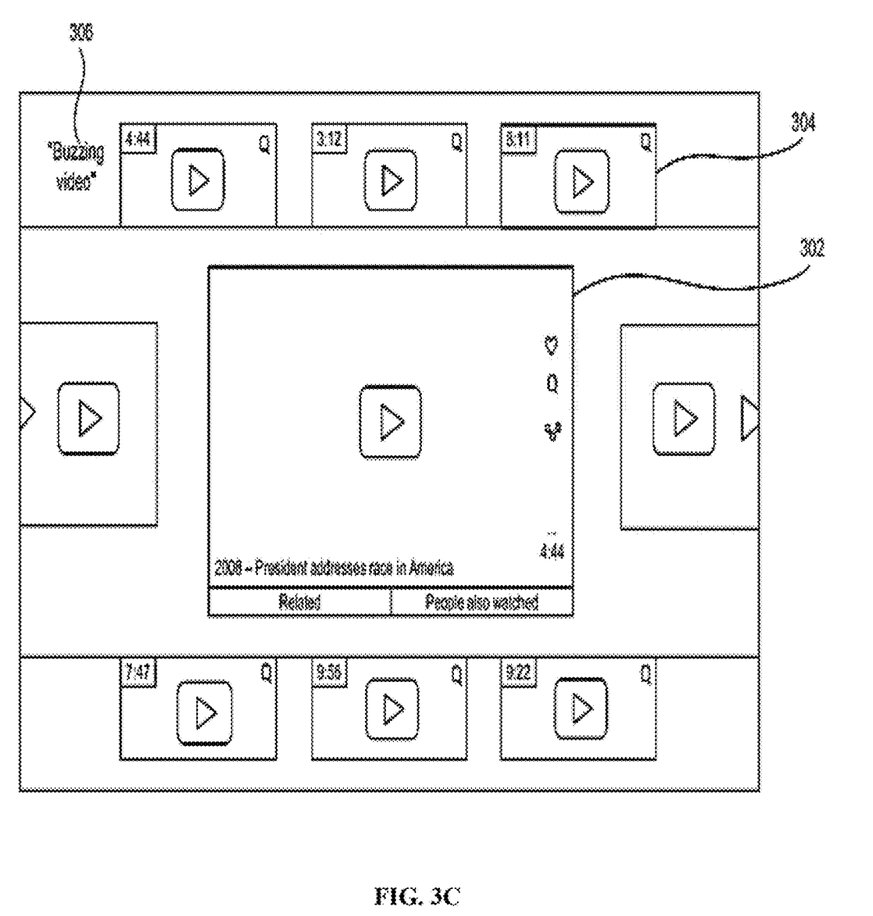

FIG. 3A through FIG. 3C illustrates a user interface view of the multimedia content recommendation server 108 of FIG. 1 according to an embodiment herein. In particular, FIG. 3A is a user interface view of the multimedia content recommendation server 108 illustrating a method of displaying one or more similar videos (e.g., a video of "small brushless motors make electronic skateboards possible", a video on "Is Lightt an Instagram killer? It sure is fun!") related to a video of Scoble (e.g., Audi sports car experience with SCOTTEVEST, CEO Scott Jordan) displayed in a video field 302. The user interface views of FIG. 3A through FIG. 3C include the video field 302, and a similar videos field 304.

The video field 302 displays a particular video based on the at least one criteria. The similar videos field 304 displays other similar videos along with the one or more reasons via the particular video. In one embodiment, reasons field 306 may be a criteria associated with recommendation. The other similar videos are related to the particular video that is being watched by the user 102, in one example embodiment. The other similar videos may be displayed based on (i) a character in the video displayed in the video field 302, and/or (ii) a topic related to the video displayed in the video field 302.

Similarly, FIG. 3B is a user interface view of the multimedia content recommendation server 108 illustrating a method of displaying one or more similar videos that are related to (i) a history channel (e.g., a) Ask History: Ask History: Electrola College, b) The man who built America: The Every man, c) Outback hunters: Croc vs. Gators?, etc.) and (ii) a video (e.g., Outback hunters: Croc behavior?) displayed in the video field 302.

Similarly, FIG. 3C is a user interface view of the multimedia content recommendation server 108 illustrating a method of displaying one or more similar videos (e.g., a video on Charice sings God bless America, a video on Obama hates bible, God and not just America, etc.) that are related to a video (e.g., 2008: Obama addresses race in America) displayed on the video field 302. The one or more reasons may be overlaid on the one or more similar videos, in one example embodiment. The one or more reasons may be displayed (e.g., via a dialogue box or a pop-up window) to the user 102 when (i) a click on the one or more similar videos is received, and/or (ii) a cursor is experienced on the one or more similar videos (e.g., a mouse hover), in another example embodiment. The one or more reasons may be displayed to the user 102 without receiving an input on the one or more similar videos, in yet another example embodiment.

Figure 4:
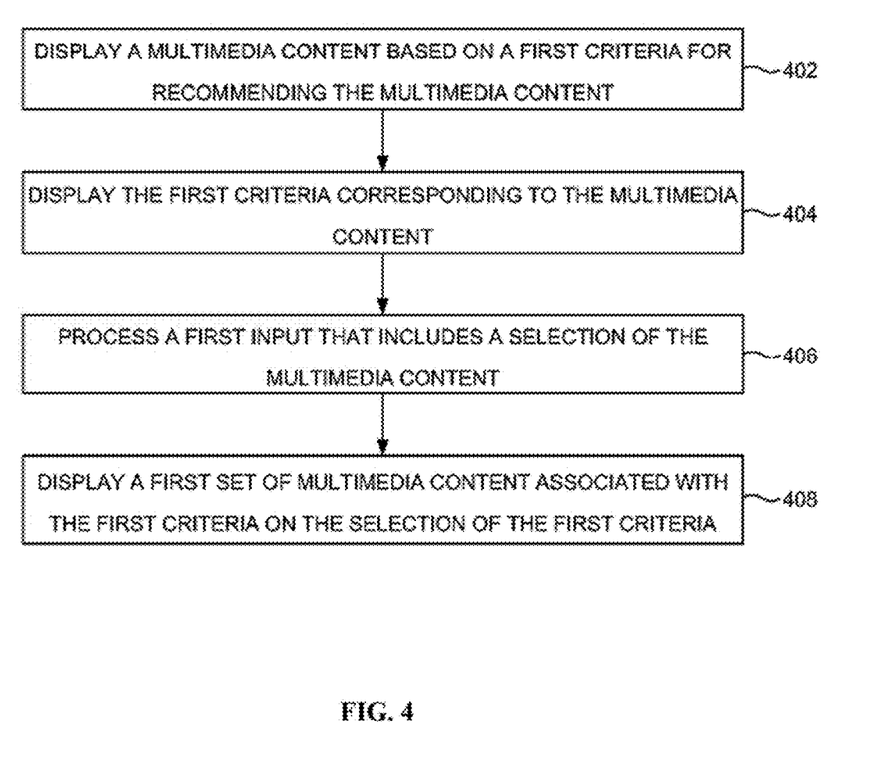
FIG. 4 is a flow diagram illustrating a method of multimedia content discovery and navigation based on criteria for recommendation according to an embodiment herein.

FIG. 4, with reference to FIGS. 1 through 3 is a flow diagram illustrating a method of multimedia content discovery and navigation based on criteria for recommendation using the multimedia content recommendation server 108 of FIG. 1 according to an embodiment herein. In step 402, at least one multimedia content (e.g., a video of a famous Hollywood actor) is displayed based on a first criteria (e.g., a popularity) for recommending the at least one multimedia content. In step 404, the first criteria corresponding to the at least one multimedia content is displayed. In step 406, a first input that includes a selection of the at least one multimedia content is processed. In step 408, a first set of multimedia content (e.g., one or more videos or any other multimedia content such as movies of the famous Hollywood actor) associated with the first criteria is displayed based on the selection of the first criteria. Any activity in which the famous Hollywood actor is involved such as attending a film festival, an inauguration ceremony, and/or an interview at a TV show, etc. may also be considered as part of the first set of multimedia content, in one example embodiment.

Figure 5:
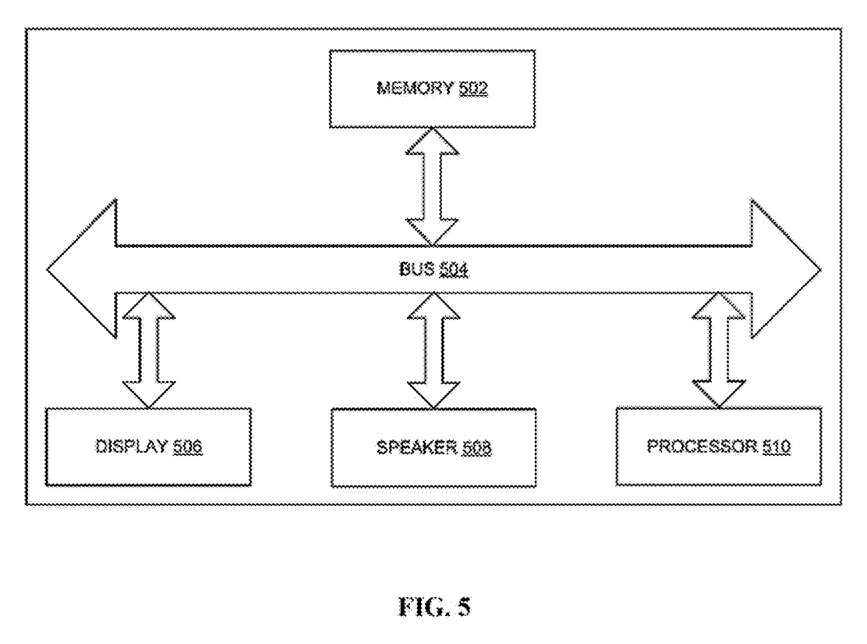
FIG. 5 illustrates a schematic diagram of the user device of FIG. 1 according to an embodiment herein.

FIG. 5 illustrates a schematic diagram of the user device 104 of FIG. 1 having an a memory 502 having a set of instructions, a bus 504, a display 506, a speaker 508, and a processor 510 capable of processing a set of instructions to perform any one or more of the methodologies herein, according to an embodiment herein. The processor 510 is the same application processor, in one embodiment. The processor 510 may also enable digital content to be consumed in the form of video for output via one or more displays 506 or audio for output via speaker and/or earphones 508. The processor 510 may also carry out the methods described herein and in accordance with the embodiments herein.

Digital content may also be stored in the memory 502 for future processing or consumption. The memory 502 may also store program specific information and/or service information (PSI/SI), including information about digital content (e.g., the detected information bits) available in the future or stored from the past. The user 102 of the user device 104 may view this stored information on the display 506 and select an item of for viewing, listening, or other uses via input, which may take the form of keypad, scroll, or other input device(s) or combinations thereof. When digital content is selected, the processor 510 may pass information. The content and PSI/SI may be passed among functions within the user device 104 using the bus 504.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
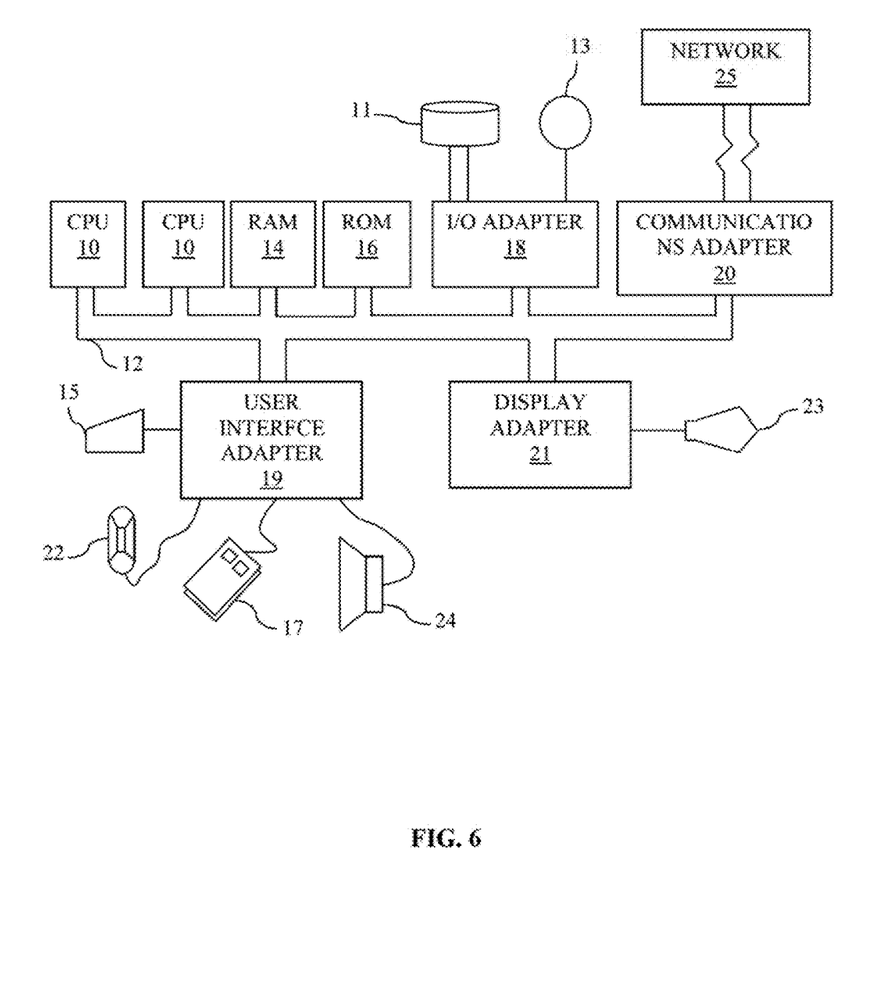
FIG. 6 illustrates a schematic diagram of a computer architecture used in accordance with the embodiments herein.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The multimedia content recommendation server (i) displays one or more multimedia content (e.g., one or more videos) along with one or more reasons/at least one criteria to the user, (ii) allows the user 102 to a) view/watch a particular video from the one or more videos, b) easily navigate other similar videos along with the one or more reasons/at least one criteria of a particular video being watched. Users are served videos with one or more reasons so that the users can connect with the videos easily.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A computer implemented method comprising instructions stored on a nor-transitory computer readable storage medium and executed on a system provided with a hardware processor and memory for multimedia content discovery and navigation based on criteria for recommendation, said method comprises:
    displaying a multimedia content by a multimedia content display module based on at least one criteria tor recommending said multimedia content;
    mapping said criteria with at least one multimedia content fulfilling said criteria by a criteria selection module, and selectively creating a list incorporating multimedia content fulfilling said criteria;
    displaying said at least one criteria by a criteria display module for recommending said multimedia content along with said multimedia content;
    processing a first input comprising a selection of criteria for recommending said multimedia content by the criteria selection module;
    processing a second input comprising a selection of said at least one criteria by the criteria selection module;
    playing said multimedia content on said selection of said multimedia content by a multimedia content display module, wherein playing said multimedia content further includes playing said multimedia content along with at least one reason for recommending said multimedia content and displaying one or more multimedia contents that are similar to said played multimedia content along with one or more reasons/criteria of said played multimedia content, and wherein the one or more reasons are overlaid on the one or more multimedia contents that are similar to said played multimedia content, and wherein the one or more reasons is are displayed through a dialogue box to the user when a click on the one or more similar videos is received, and/or a mouse is hovered on the one or more similar videos, and wherein the one or more reasons is displayed to the user even without receiving an input on the one or more similar videos, and wherein said at least one criteria comprises at least one or more reasons based on a popularity of a multimedia content, entity related to a multimedia content and wherein the entity includes a topic and persons involved with the multimedia content, all time popular or trending/popular currently at a given time, popular within user geography or location, activities on multimedia content by popular celebrities, reasons based on user favorites, and wherein the user favorites includes a favorite multimedia content, genre/category, source comprising channels, similar to past activity of user, people related to multimedia content/celebrities, activities on multimedia content by favorite celebrities and activities on multimedia content from user network, and reasons based on friends activities, and wherein friends' activities includes one or more activities selected from a group consisting of shared by friend, liked by friend, multimedia content watched by friend rated by a friend, queued by friend, and commented by friend.

2. The method of claim 1, further comprises displaying a first set of multimedia content associated with said at least one criteria on said selection of said at least one criteria by the multimedia content display module.

3. A multimedia content recommendation server comprising:
    a memory unit comprising a database that stores at least one criteria for recommending multimedia content and at least one list of multimedia content associated with said at least one criteria;
    a processor that executes a set of modules comprising;
    criteria display module configured and executed by and executed by said processor to display at least one first criteria for recommending at least one multimedia content;
    criteria selection module configured and executed by said processor to process a first input comprising a selection of said at least one first criteria for recommending, said at least one multimedia content; and
    a multimedia content display module configured sand executed by said processor to:
    display said at least one multimedia content associated with said at least one, first criteria tor recommending said at least one multimedia content, and display a first set of multimedia content associated with said at least one first criteria tor recommending said at least one multimedia content on said selection of said at least one first criteria, wherein said multimedia content display module is further con figured to display along with said multimedia content, at least one reason for recommending said multimedia content and wherein said multimedia content display module is further configured to display one or more multimedia contents that are similar said played multimedia, content along with one or more reasons/criteria of said played multimedia, and wherein the one or more reasons are displayed when a cursor is detected on played multimedia content, and wherein the one or more reasons is displayed through a dialogue box to the user when a click on the one or more similar videos is received, and/or a mouse is hovered on the one or more similar videos, and wherein the one or more reasons may be displayed to the user even without receiving an input on the one or more similar videos, and wherein said at least one criteria comprises at least one or more reasons based on a popularity of a multimedia content, entity related to a multimedia content and wherein the entity includes a topic and persons involved with the multimedia content, all time popular or trending/popular currently at a given time, popular within user geography or location, activities on multimedia content by popular celebrities, reasons based on user favorites, and wherein the user favorites includes a favorite multimedia content, genre/category, source comprising channels, similar to past activity of user, people related to multimedia content/celebrities, activities on multimedia content by favorite celebrities and activities on multimedia content from user network, and reasons based on friends activities, and wherein friends' activities includes one or more activities selected from a group consisting of shared by friend, liked by friend, multimedia content watched by friend rated by a friend, queued by friend, and commented by friend.

4. A non-transitory computer readable program storage device readable comprising a program of instructions executed on a hardware processor in said computer to perform a method of multimedia content discovery and navigation based on criteria for recommendation, said method comprises;

displaying at least one multimedia content by a multimedia content display module based on a first criteria for recommending said at least one multimedia content;

displaying said first criteria corresponding to said at least one multimedia content by a criteria display module;

mapping said criteria with at least one multimedia content fulfilling said criteria by a criteria selection module, and selectively creating a list incorporating multimedia content fulfilling said criteria;

processing a first input comprising a selection a of criteria module; recommending said multimedia content by the criteria selection module;

playing a first set of multimedia content associated with said first criteria on said selection of said first criteria by the multimedia content display module, wherein displaying said multimedia content further includes displaying said multimedia content along with at least one reason for recommending said multimedia content and displaying one or more multimedia contents that are similar to said played multimedia content along with one or more reasons/criteria of said played multimedia content and wherein the one or more reasons are overlaid on the one or more multimedia contents that are similar to said displayed through a dialogue box to the user when a click on the one or more similar videos is received, and/or a mouse is hovered on the one or more similar videos, and wherein the one or more reasons may be displayed to the user even without receiving an input on the one or more similar videos, and wherein said at least one criteria comprises at least one or more reasons based on a popularity of a multimedia content, entity related to a multimedia content and wherein the entity includes a topic and persons involved with the multimedia content, all time popular or trending/popular currently at a given time, popular within user geography or location, activities on multimedia content by popular celebrities, reasons based on user favorites, and wherein the user favorites includes a favorite multimedia content, genre/category, source comprising channels, similar to past activity of user, people related to multimedia content/celebrities activities on multimedia content by favorite celebrities and activities on multimedia content from user network:, and reasons based on friends activities, and wherein friends' activities includes one or more activities selected from a group consisting of shared by friend, liked by friend, multimedia content watched by friend rated by a friend, queued by friend, and commented by friend.

* * * * *